Aug. 6, 1957  J. J. BRANDON  2,801,678
ADJUSTABLE HEAD REST FOR SEAT STRUCTURE
Filed July 2, 1953
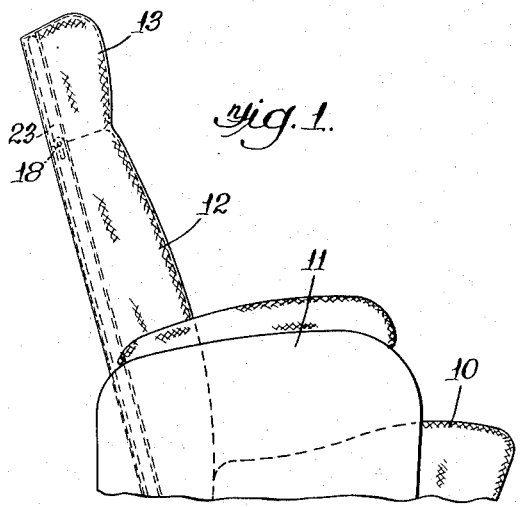
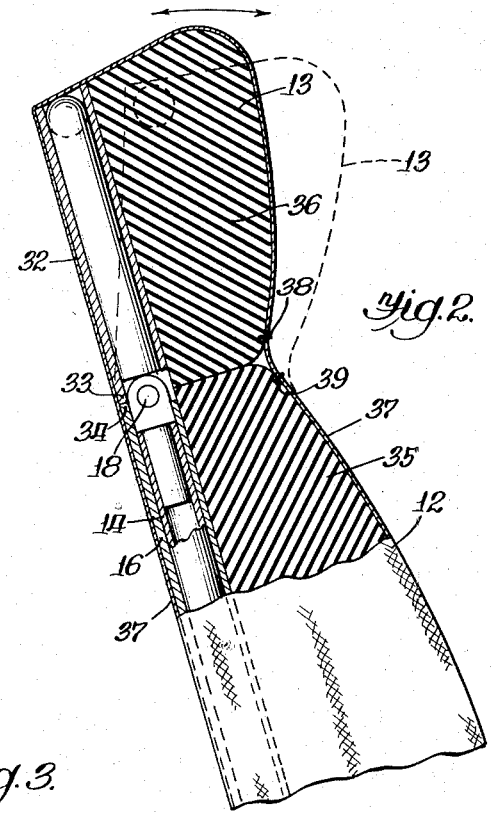
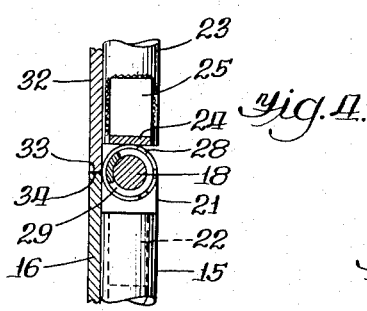
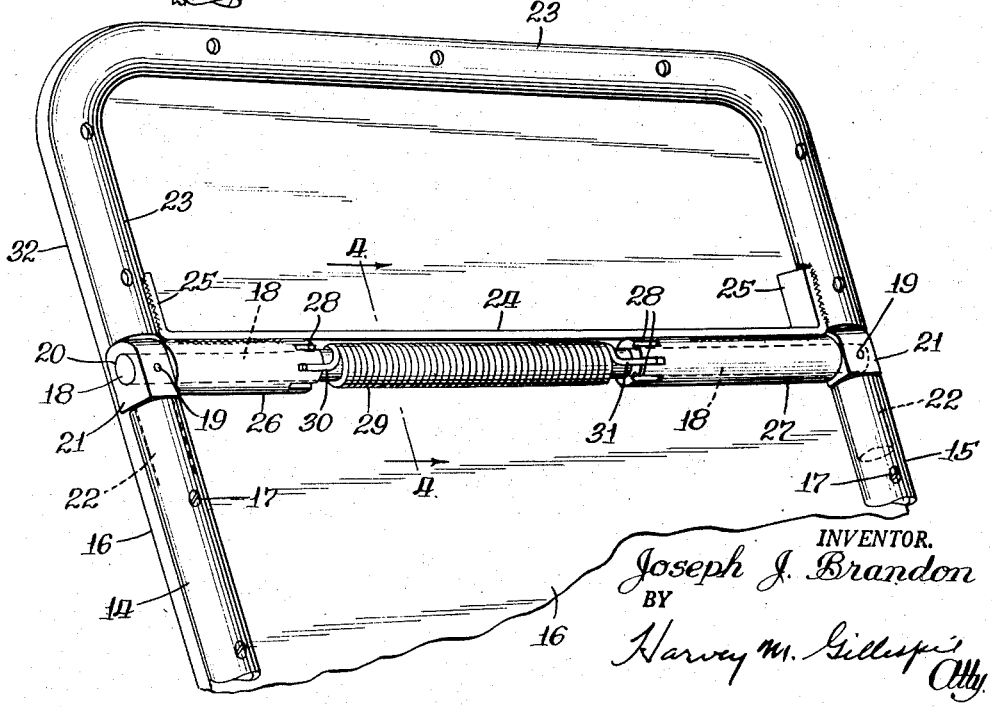
INVENTOR.
Joseph J. Brandon
BY
Harvey M. Gillespie
Atty.

United States Patent Office 2,801,678
Patented Aug. 6, 1957

2,801,678
ADJUSTABLE HEAD REST FOR SEAT STRUCTURE

Joseph J. Brandon, Chicago, Ill., assignor to Coach & Car Equipment Corporation, Chicago, Ill., a corporation of Illinois Application July 2, 1953, Serial No. 365,579

5 Claims. (Cl. 155—177)

This invention relates to improvements in head rest structures for seats of the various types used in passenger vehicles including railway passenger cars, aircraft, and highway buses.

The more modern types of seat structures currently used in vehicles of the above character are ordinarily provided with seat backs which extend upwardly a distance sufficient to provide a head rest for the passenger, the head rest being a fixed portion of the back structure and usually in the form of a forwardly protruding roll formed in the upholstery along the upper end of the back rest. Such fixed head rests, however, are not entirely satisfactory, since, in many instances they do not provide the comfort requirements of individual passengers.

The present invention is directed to the problem of providing a suitable head rest which may be adjusted to provide maximum comfort to individual passengers. To this end, the principal object of the invention is to provide a seat back with a head rest portion which may be readily and conveniently adjusted to such position relative to the seat back as will afford the greatest comfort to the passenger occupying the seat.

A further object is to provide an adjustable head rest of the above character which will retain its adjusted position by means of frictional engagement of relatively movable parts.

The more specific objects of the invention are directed to the provision of a head rest structure which is hinged to the upper portion of a seat back, whereby the head rest may be adjusted to various inclined positions relative to the seat back by merely applying appropriate force to the upper portion of the head rest in the direction of the adjustment desired and without requiring the release of latching or other locking mechanism preliminary to such adjustment.

In this connection, the invention contemplates the provision of a seat back structure composed of two sections hingedly connected to each other and a friction member in the form of a coiled spring mounted on a rod or shaft forming a part of one of said sections and having both ends of the spring anchored to the other of said sections, the said spring element being suitably torsioned to contract its coils into tight gripping engagement with said rod or shaft and thereby provide the desired friction to retain the head rest in an adjusted position.

Another object is to provide means whereby the torsion of the said spring member may be adjusted from time to time to compensate for any looseness occasioned by attrition of the coengaged friction surfaces.

The invention is illustrated, in certain preferred embodiments, in the accompanying drawing wherein:

Fig. 1 is a fragmentary view in side elevation of a seat back structure provided with an adjustable head rest in accordance with this invention;

Fig. 2 is a fragmentary enlarged section of the head rest and adjacent portions of the seat back shown in Fig. 1;

Fig. 3 is a view in perspective of a portion of the frame for the lower or back rest section of the structure together with the supporting frame of the head rest section thereof and showing its hinged connection with the two sections of the frame; and Fig. 4 is a fragmentary view, partly in section, illustrating the hinged connection between the frame of the head rest and the frame of the back rest section.

The seat structure may be described briefly as comprising a seat cushion 10, arm rest 11, and a sectional seat back comprising a back rest section 12 and a head rest section 13 supported for movement relative to the back rest section 12. The back rest section 12 includes a frame structure comprising tubular side members 14 and 15 which may be secured in any suitable manner to the under-frame or base of the seat structure (not shown). Also the seat back structure as a whole may be fixed in a predetermined position or it may be adjustable in a known manner to various reclining positions, since the improved head rest of the present invention may form a part of any known type of seat back structure capable of being formed in two sections. While the broad aspect of the invention includes a head rest section which is movable in any manner relative to the back rest section, the said head rest is shown herein as being hinged to the back rest section so as to be adjusted to various inclined positions relative to the back rest section.

The side members 14 and 15 for the section 12 are secured in suitably spaced relation to each other by means of a back panel 16 secured in any suitable manner to the tubes, for example by screws 17. This section of the seat back structure is also rigidified by means of a transverse rod or shaft 18, the ends of which are secured by pins 19 in bores 20 formed in the head portion of anchor studs 21, 21. The said anchor studs are also provided with stem portions 22 which are firmly secured in the upper ends of the tube 14, 15.

The head rest portion 13 is provided with a tubular frame 23 comprising a single tube bent into a U-shaped configuration. A cross brace 24 provided with upturned ends 25—25 is welded or otherwise suitably secured to the downturned end portions of the frame 23 so as to provide a relatively rigid rectangular structure. The said frame 23 is hingedly mounted on the rod or shaft 18. To this end sleeve members 26—27 are secured in alignment to the under side of the cross brace 24 so as to receive the rod 18. The said sleeves 26, 27 are arranged in spaced relation to each other and the adjacent ends thereof are provided, in each case, with a series of radial slots 28. A coiled spring 29 surrounds the rod 18 in the space between the adjacent ends of said sleeves and its ends 30, 31 are turned about the rod 18 in opposite directions to torsion the spring. The torsioning of the spring reduces its diameter and thereby causes it to frictionally grip the rod 18. When the spring 29 is suitably torsioned to provide the desired amount of friction to hold the head rest 13 against accidental movement, the ends 30, 31 of the spring 29 are inserted in the radial slots 28, 28 and thereby lock the spring 29 to the frame of the head rest section 13. Consequently, any pivotal movement of the head rest section 13 relative to the back rest section 12 causes the spring 29 to rotate about the rod 18.

A panel member 32 is secured to the rear face of the head rest frame so that its lower end 33 will abut against the upper end 34 of the panel 16 when the downturned ends of the tubular frame element 23 of the head rest 13 is in longitudinal alignment with the tubular frame elements 14—15 of the back rest section 12. The said abutting engagement of the back panels 16 and 32 therefore restrict the adjusting movements of the head rest 13 to positions which are forward relative to the back rest section 12.

During the assembly of the head rest frame structure onto the back rest frame, the rod 18 is passed axially through the sleeves 26, 27 and through the coiled spring 29 during the insertion of the rod 18. The provision of a plurality of said slots 28 facilitates increasing the torsion of the spring 29 to compensate for looseness occasioned by attrition of the coengaging faces of the spring 29 and the rod 18.

The upholstery of the back structure includes a section of foam rubber 35 mounted on the frame structure of the back rest and a block of foam rubber 36 mounted on the frame of the head rest and the entire structure is then enclosed in a fabric covering 37 which may be stitched to the foam rubber 35 and 36, as indicated at 38 and 39 at or near the locations when the upholstery is compressed by the forwardly hinging of the head rest section 13 shown in dotted lines in Fig. 2.

I claim:

1. A seat back structure comprising a back rest section, a head rest section, means for hingedly attaching the head rest section to the upper end portion of the back rest section, comprising spaced apart hinge elements secured to one of said sections and each having an opening therethrough, a cooperating hinge rod secured to the other of said sections and extending through said openings of the spaced apart hinge elements, whereby the head rest may be adjusted in opposite directions to various forward angular positions relative to the back rest section, and means comprising a contractable sleeve revolvably mounted on said rod and pre-set in slidable frictional gripping engagement therewith and anchored to said spaced apart hinge elements for frictionally retaining the head rest section in various adjusted positions relative to the back rest section.

2. A seat back structure comprising a back rest section, a head rest section, means for hingedly attaching the head rest section to the upper end portion of the back rest section, comprising spaced apart hinge elements secured to one of said sections and each having an opening therethrough, a cooperating hinge rod secured to the other of said sections and extending through said openings of the spaced apart hinge elements, whereby the head rest may be adjusted in opposite directions to various forward angular positions relative to the back rest section, and means comprising a coiled torsion spring revolvably mounted on said rod in pre-set slidable frictional gripping engagement therewith and anchored to said spaced apart hinge elements for frictionally retaining the head rest section in various adjusted positions relative to the back rest section.

3. A seat back structure comprising a back rest section including a frame having side posts and a transversely extending bar secured to the upper ends of the side posts, a head rest section including a frame having a pair of spaced apart axially aligned sleeves secured thereto and rotatably embracing said transversely extending bar for hingedly connecting the back rest section and the head rest section together with capacity for angular adjustment of the head rest section relative to the back rest section, a coiled torsion spring inserted on said transverse rod in the space between said sleeves with its opposite ends adjustably secured to said sleeves to provide the spring with pre-adjusted torsion for frictionally gripping said rod, whereby the head rest is movable to various angular positions relative to the back rest and the pre-adjusted frictional gripping engagement of the spring on said rod retains the head rest section in any selected position of adjustment.

4. A seat back structure as defined in claim 3 characterized in that the adjacent ends of said sleeves are provided with a series of notches for receiving the opposite ends of said torsion spring, whereby an end portion of the spring may be shifted from one notch to another to vary the torsional adjustment of said spring and thereby vary its frictional grip on said rod.

5. A seat back structure as defined in claim 4 characterized in that the side posts of the back rest are tubular and in that anchor studs are secured to the upper ends of these tubular side posts, and the transversely extending rod is removably secured in said anchor studs to facilitate assembling the hinged connection of head rest section to the back rest section and to facilitate assembly of said torsion spring in its operative position.

References Cited in the file of this patent

UNITED STATES PATENTS

| | | |
|---|---|---|
| 134,733 | Collins | Jan. 14, 1873 |
| 594,543 | Lee | Nov. 30, 1897 |
| 2,645,446 | Ulrich | July 14, 1953 |

FOREIGN PATENTS

| | | |
|---|---|---|
| 130,463 | Sweden | Jan. 2, 1951 |